United States Patent [19]

Niki et al.

[11] Patent Number: 5,048,459

[45] Date of Patent: Sep. 17, 1991

[54] APPARATUS FOR RAISING EXPERIMENTAL ANIMALS

[76] Inventors: Motohiro Niki; Mieko Niki; Etsuko Niki; Misako Niki, all of 2-22-11, Yushima, Bunkyo-Ku, Tokyo-To, Japan; Kap J. Lee, R.R. #1, Box 123, Grand Forks, N. Dak. 58201

[21] Appl. No.: 603,124

[22] Filed: Oct. 25, 1990

[30] Foreign Application Priority Data

Oct. 26, 1989 [JP] Japan ............................. 1-277062

[51] Int. Cl.⁵ ............................................. A01K 1/03
[52] U.S. Cl. .......................................... 119/17; 119/15
[58] Field of Search ........................ 119/15, 17, 19, 18

[56] References Cited

U.S. PATENT DOCUMENTS

| 3,830,200 | 8/1974 | Patterson | 119/17 |
| 4,085,705 | 4/1978 | Gland et al. | 119/17 |
| 5,000,120 | 3/1991 | Coiro et al. | 119/15 |
| 5,003,922 | 4/1991 | Niki | 119/17 |

FOREIGN PATENT DOCUMENTS 2509573 1/1983 France ................................ 119/17

Primary Examiner—John G. Weiss
Attorney, Agent, or Firm—Ladas & Parry

[57] ABSTRACT

In an apparatus for raising experimental animals, a cage for confining animals is placed in a received position within a cage rack. The cage includes a casing and a lid separate from the casing, for closing an open top of the casing. Slide rails are mounted to the cage rack for sliding the casing of the cage in a guiding direction to the received position within the cage rack. Downwardly concave leaf springs are mounted to the cage rack for resiliently depressing the upper surface of the lid of the cage toward the slide rails for positively holding the lid and the casing against movement when the cage is in the received position.

6 Claims, 3 Drawing Sheets

APPARATUS FOR RAISING EXPERIMENTAL ANIMALS

BACKGROUND OF THE INVENTION

The present invention relates to an apparatus for raising animals, such as mice and rats, by supplying fresh air to a cage or cages.

Recently, there has been developed a method of supplying germ-free fresh air to a cage to rear relatively small experimental animals, such as mice and rats. For hermetical seal, the cage includes a substantially rectangular box-shaped casing with an open top, and a lid closing the open top of the casing. The cage is provided with openings formed through a rear side wall thereof for inserting air supply and exhaust conduits and a spout of a water dispenser, respectively. When the cage is placed in a received position in a cage rack, the air supply and exhaust conduits and a spout of a water dispenser which are provided to the cage rack sealingly pass through respective openings of the cage. An example of such a cage is disclosed in U.S. Pat. No. 4,346,672 to Niki.

When cages of this type are placed on a cage rack, experimental animals in the cages are liable to move lids, so that contaminated air can be exhausted from within the cages through the open tops thereof or the animals may escape from the cages. Various attempts have made to positively lock the lids of the cages but it is laborious to operate the lid locking mechanism for bringing animals into and out of the cages.

SUMMARY OF THE INVENTION

Accordingly, it is an object of the present invention to provide an apparatus for raising experimental animals, which apparatus positively immovably hold a lid of a cage as well as the cage when the cage is placed in position on a cage rack.

With this and other object in view the present invention provides an apparatus for raising experimental animals, which comprises: a cage rack; cages for confining animals, each of the cages being adapted to be placed in a received position within the cage rack and including a casing, having an open top, and a lid separate from the casing, for closing the open top of the casing, the lid having an upper surface; sliding means, mounted to the cage rack, for sliding the casing of the cage in a guiding direction to the received position within the cage rack; and resilient depressing means, mounted to the cage rack, for engaging and resiliently depressing the upper surface of the lid of the cage toward the sliding means for positively holding the lid and the casing against movement.

DETAILED DESCRIPTION OF THE PREFERRED EMBODIMENT

Figure 1:
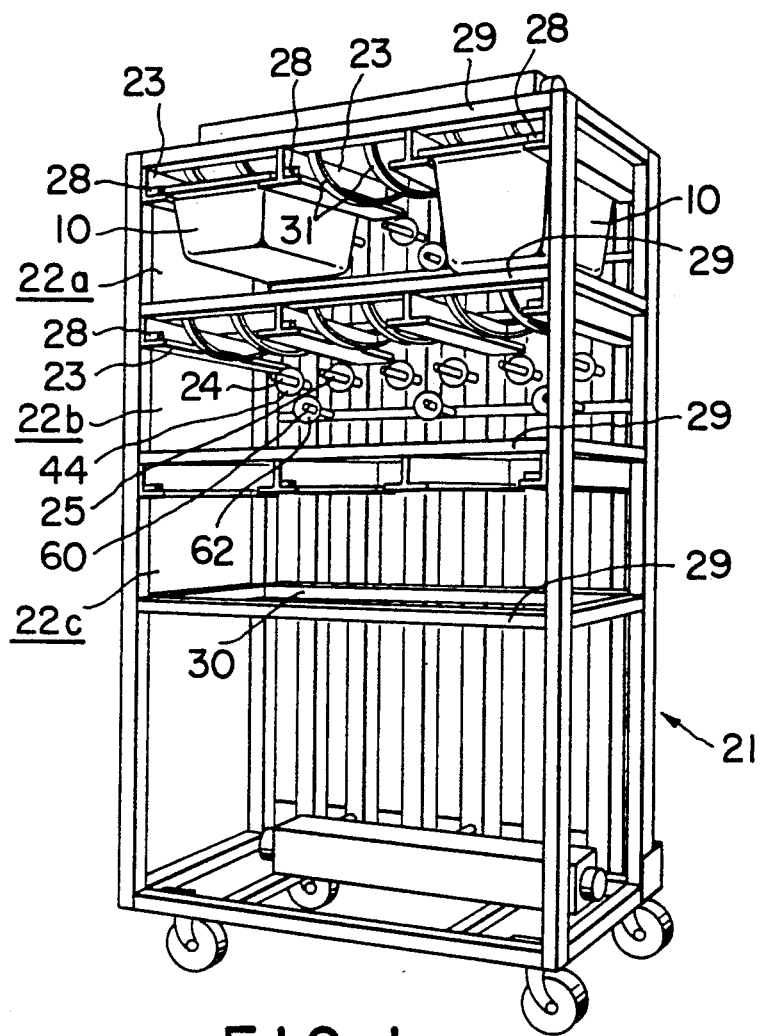
FIG. 1 is a perspective view of an experimental animal raising apparatus of the present invention
Figure 2:
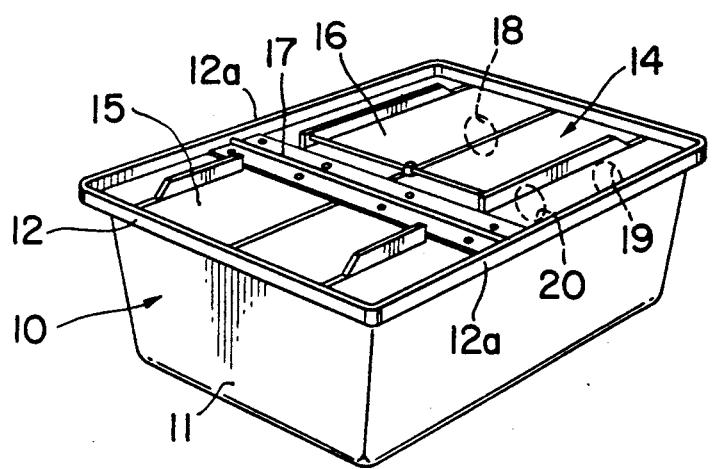
FIG. 2 is an enlarged perspective view of one of the cages shown in FIG. 1.
Figure 3:
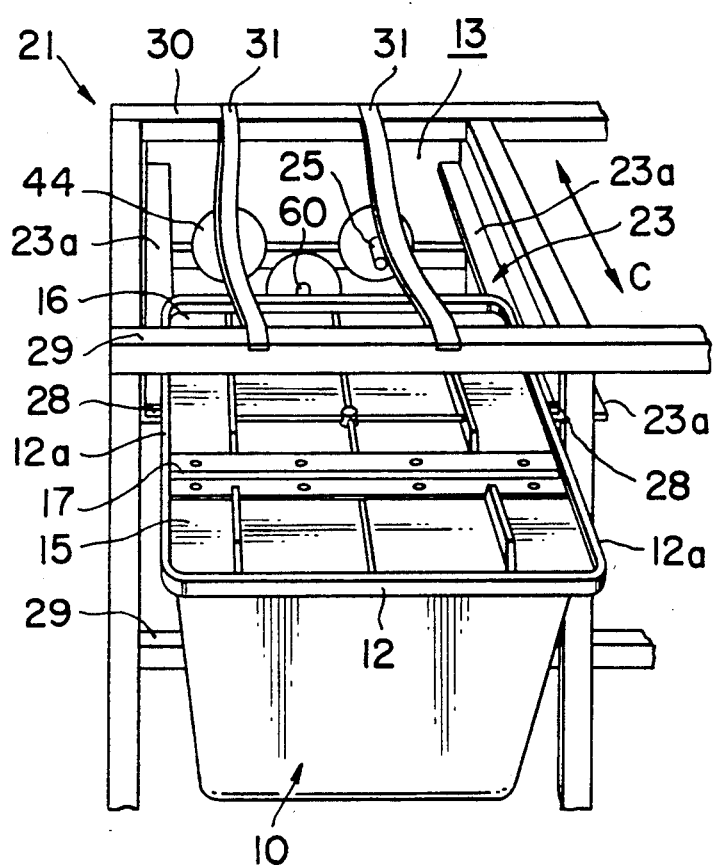
FIG. 3 is an enlarged perspective view explanatory of a rack space for a single cage of the experimental animal raising apparatus of FIG. 1, with a cage partly inserted into the space.

Referring to FIGS. 1 to 4, an experimental animal raising apparatus of the present invention will be described. In FIG. 2, a cage 10 is designed to confine and raise an experimental animal or animals such as mice and rats. The cage 10 includes a casing 11 molded in the shape of an open top rectangular box from a plastic material. The casing 11 has an integrally formed circumferential flange 12 on the upper most edge thereof. The flange 12 is made up of a horizontal extension and a vertical extension extending upward from the outer edge of the horizontal extension. The circumferential flange 12 includes a pair of opposite side flanges 12a and 12a which slide on parallel guide rails 23 and fixed on a cage rack 21 as described hereinafter, when the cage 10 is inserted into a cage space 13 of the cage rack 21 (FIG. 3).

A lid 14 is placed on the horizontal extension of the flange 12 of the casing 11 for closing the open top in a hermetically sealed manner. The lid 14 includes a rear portion 16 and a front portion 15 which is connected to the rear portion 16 through a hinge 17 to be swingable upward to provide a food inlet 114 (FIG. 4) in the open top of the casing 11. The front portion 15 is opened to supply food into a food basket 34 placed within the cage 10. As shown in FIG. 2, the casing 11 has two upper openings 18 and 19 and one lower opening 20 formed through its rear side wall. As indicated in FIG. 1, an air supply conduit 24, an air exhaust conduit 25 and a spout 260 of a water dispenser are provided on the rack 21. The conduits 24 and 25 and the spout 260 are sealingly fitted through the openings 18, 19 and 20, respectively, as described in detail hereinafter.

Several cages 10 with various depths may be placed within the cage rack 21 as illustrated in FIG. 1. In this embodiment, the cage rack 21 includes three cage accommodating spaces 22a, 22b and 22c. Each of the cage accommodating spaces 22a, 22a and 22a is horizontally divided into three cage spaces 13 (FIG. 3) by parallel guide rails or slide rails 23 of inverted-T-shaped cross section. The slide rails 23 are secured to the cage rack 21 to span an upper front beam 29 and an upper rear beam 30 at lateral intervals substantially equal to the width of each cage space 13. Each cage space 13 accommodates one cage 11. A set of an air supply conduit 24, an air exhaust conduit 25 and a watering spout 60 is provided for each cage space 13 of the upper, middle and lower cage accommodating spaces 22a, 22b and 22c although FIG. 1 does not show the conduits 24 and 25 and the spout 60 in the lower cage accommodating space 22c.

Each slide rail 23 has a pair of horizontal rail flanges 23a for guiding a corresponding cage 10 placed thereon. Each cage 10 is inserted into one of the cage spaces 13 as shown in FIG. 3, with the side flanges 12a of the cage sliding on respective rail flanges 23a of corresponding slide rails 23. Each of the rail flanges 23a has an appropriate stopper 28 for positioning, provided at its front end to engage a front portion of the circumferential flange 12 of the cage 10. The cage 10 is inserted to a received position within the cage space 13 by overriding the stopper 28 and then pulled forward to abut the front portion of the flange 12 against the stopper 28, as illustrated in FIG. 1.

As clearly shown in FIG. 3, a pair of parallel leaf springs 31 and 31 are provided to span the front beam 29 and the rear beam 30 for each cage space 13 in the direction of slide of the cage. Each of the leaf springs 31 has a downwardly convex shape such that the lower surface thereof resiliently depresses the lid 14 of the corresponding cage 10 when the latter is placed in a received position within the cage space 13 as shown in FIG. 1.

Figure 4:
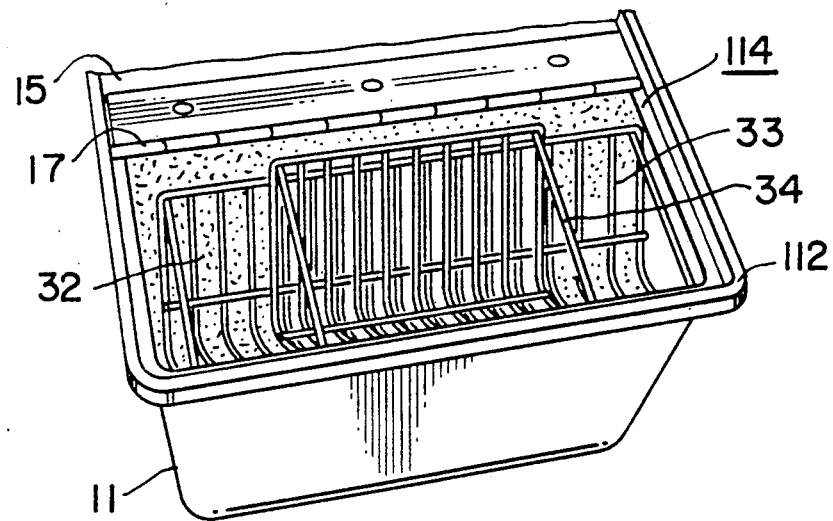
FIG. 4 is an enlarged fragmental view of the cage of FIG. 2 with the lid opened to show a food basket.

In FIG. 4, the reference numeral 32 designates wood chips laid over the bottom of the casing 11, and 33 a food frame made of a wire grill for receiving the food basket 34 thereon. The food basket 34 is also made of a wire grill, and food is supplied into the food basket 34.

When one cage 10 is inserted into one of the cage spaces 13, the lid 14 thereof is brought into resilient surface contact with the lower surfaces of the corresponding leaf springs 31. Thus, the upper surface 14a of the lid 14 is resiliently depressed by the leaf springs 31, and the casing 11 of the cage 10 is held through its side flanges 12a on the corresponding slide rails 23. In this manner, the lid 14 is positively held against the casing 11, which is held to the cage rack 21 without any vertical or sideward movement.

This cage holding structure prevents contaminated air in each cage 10 from being released to outside and experimental animals in the cages from escaping through a gap between the lid 14 and the casing 11. In the cage holding structure, it is not necessary to provide the cage 11 with any locking mechanism for locking the lid 14 to the casing 11, and hence there is no need to operate any locking mechanism to take an experimental animal or animals into and out of the cage 10. To supply or replace food, each cage 10 is pulled forward to partly project from the cage rack 21 as shown in FIG. 3, and the front portion 15 of the lid 14 is opened. In this event, the rear portion 16 of the lid 14 is always depressed and held by the leaf springs 31. Thus, the feeding operation can be quickly made without possibility of experimental animals escaping from the cages 10 since the lids 14 and the casings 11 are held immovably.

Figure 5:
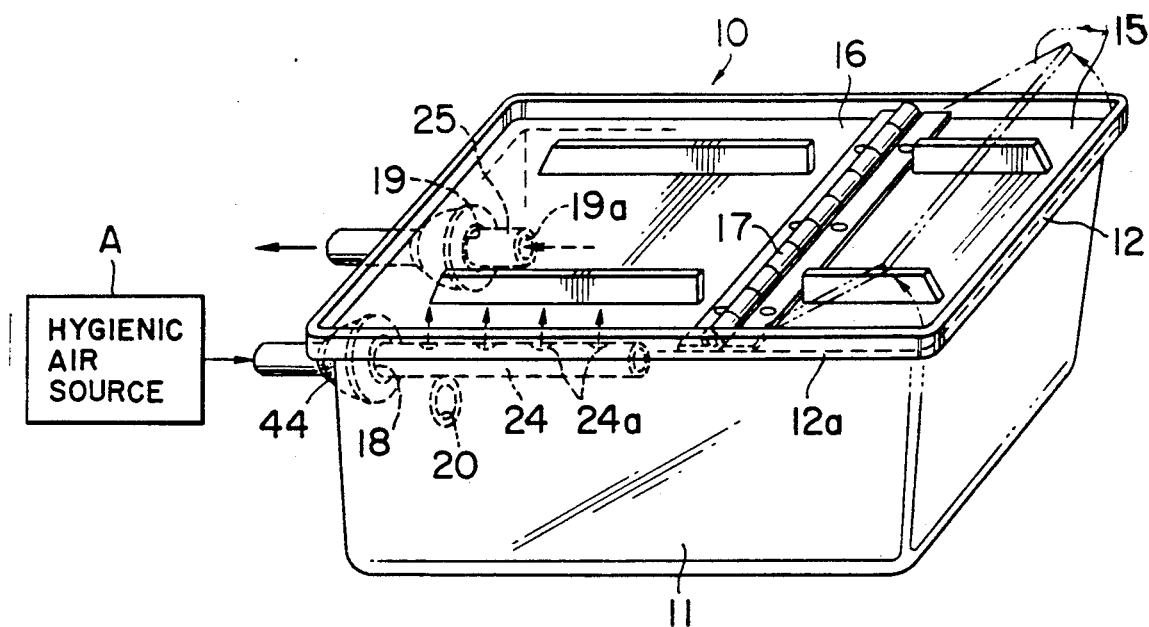
FIG. 5 is an enlarged perspective view of the cage of FIG. 1.
Figure 6:
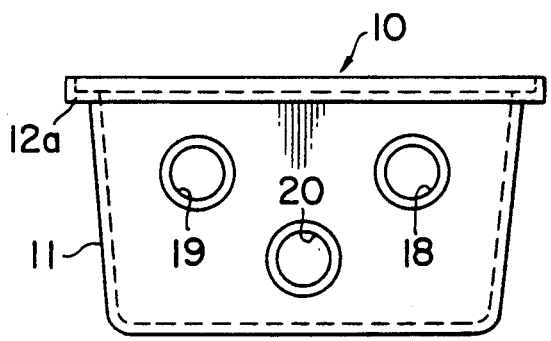
FIG. 6 is a left side view of the cage of FIG. 5.
Figure 7:
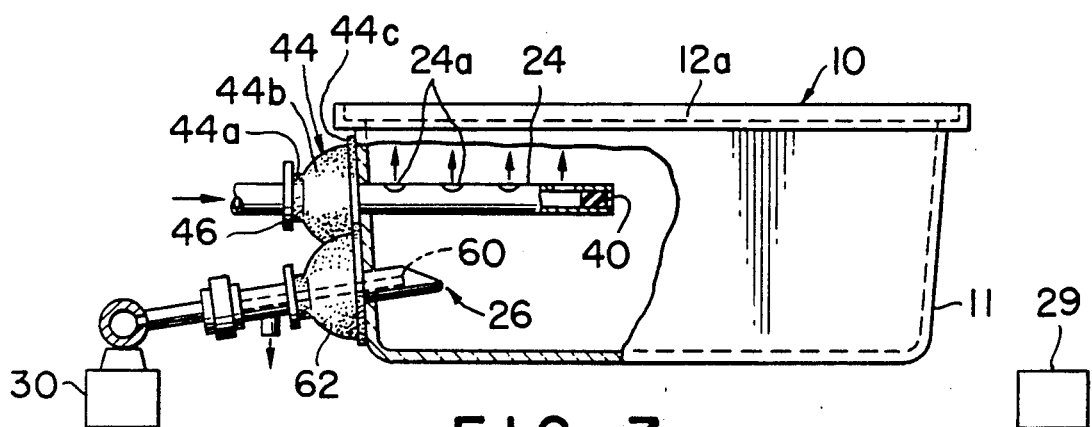
FIG. 7 is a side view, partly cut away, of the cage of FIG. 5.

With reference to FIGS. 5 to 7, an air supply and exhaust system and a water supply system of the experimental animal raising apparatus will be described.

As shown in FIG. 5, the air supply conduit 24 is passed through the opening 18 to be inserted into the interior of the cage 10. The air supply conduit 24 extends into the middle of the casing 11 and is communicatively connected to a source A of hygienic air. As also shown in FIG. 7, the air supply conduit 24 extends parallel to the inner surface of the lid 14 and has a series of air supply holes 24a formed in the upper side of the conduit 24. The distal open end of the conduit 24 is closed by a rubber plug 40 fitted snugly into the open end.

The air supply conduit 24 extends horizontally from a rear part of the cage rack 21 so that the conduit 24 itself is stationary, while the cage 10 is placed slidably on the slide rails 23. For inserting the stationary conduit 24 in position within the cage 10, the cage 10 is placed on the slide rails 23 with the rear side wall of the cage spaced apart from the distal end of the conduit 24. The cage 10 is then moved slidingly toward the conduit 24 with the opening fitted around the conduit 24 until the conduit 24 is fully inserted into the cage 10 as indicated in FIG. 7.

A connector cup 44 of rubber or like elastic material is fitted on the conduit 24. The connector cup 44 has a base end 44a fitted snugly but slidably on the conduit 24, and a cup body 44b with an annular flange 44c. The conduit 24 has a stop ring 46 fixed thereto. As the conduit 24 is inserted fully into the cage 10, the annular flange 44c of the connector cup 44 abuts and is held elastically against the rear side wall of the as indicated in FIG. 7. Because the annular flange 44c of the connector cup 44 is of a greater diameter than the opening 18, the part of the rear side wall of the cage through which the conduit 24 passes is hermetically sealed by the connector cup 44. When the cage 10 is slidingly moved away from the conduit 24, the conduit 24 can be withdrawn from within the cage 10.

In a similar way, an air exhaust conduit 25 is passed through the opening 19 as shown in FIG. 5. The exhaust conduit 25 extends a much shorter distance into the cage 10 and has an open end 19a. The exhaust conduit 25 also extends from a rear part of the rack 21 so that the conduit 25 itself is stationary. The insertion and withdrawal of the exhaust conduit 25 into and out of the cage 10 are carried out in a similar way to that described above, concurrently with the insertion and withdrawal of the supply conduit 24 by sliding the cage 10 on the slide rails 23.

The remaining lower hole 20 formed through the rear side wall is used to pass a water dispenser 26 as indicated in FIG. 7. The water dispenser 26 has a spout 60 extending into the cage 10 obliquely upwardly. The water dispenser 26 can be generally of the type described in the previously cited Niki U.S. Pat. No. 4,346,672.

Also in the case of the water dispenser 26, a connector cup 62 similar to the connector cup 44 is fitted over the spout 60 and resiliently urged against the rear side wall of the cage for sealing the part of insertion of the spout 60 through the rear side wall. The insertion and withdrawal of the spout 60 are performed concurrently with the insertion and withdrawal of the supply conduit 24 and the exhaust conduit 25.

What is claimed is:

1. An apparatus for raising experimental animals, comprising:
    a cage rack;
    cages for confining animals, each of the cages being adapted to be placed in a received position within the cage rack and including a casing, having an open top, and a lid separate from the casing, for closing the open top of the casing, the lid having an upper surface;
    sliding means, mounted to the cage rack, for sliding the casing of the cage in a guiding direction to the received position within the cage rack; and
    resilient depressing means, mounted to the cage rack, for engaging and resiliently depressing the upper surface of the lid of the cage toward the sliding means for positively holding the lid and the casing against movement.

2. An apparatus as recited in claim 1, wherein the resilient depressing means comprises a plurality of parallel elongated spring members of downwardly convex shape, each of the spring members being arranged in a direction parallel to the guiding direction and secured at opposite ends thereof to the cage rack.

3. An apparatus as recited in claim 2, wherein:
    each of the spring members comprises a leaf spring;

the casing is substantially in the shape of a rectangular box and includes a pair of side walls; and the sliding means comprises a pair of parallel slide rails, mounted to the cage rack to extend along the guiding direction, and a pair of side flanges mounted to respective side walls of the casing so that the side flanges are placed on respective sliding rails for slidable contact.

4. An apparatus as recited in claim 3, wherein:

the cage rack comprises a plurality of cage spaces each for receiving one cage; and the resilient depressing means and the sliding means are provided for each of the cage space.

5. An apparatus as recited in claim 4, wherein:

the lid comprises a rear portion and a front portion hinged to the rear portion to be vertically swingable to form a food inlet; and further comprising a food basket adapted to be placed within the cage below the front portion of the lid through the food inlet.

6. An apparatus as recited in claim 5, wherein:

the casing comprises a rear side wall having an air supply opening and an air exhaust opening formed therethrough; and the cage rack has an air supply conduit and an air exhaust conduit provided for each cage space, the air supply conduit being adapted to pass through the air supply opening whereas the air exhaust conduit is adapted to pass through the air exhaust opening.

* * * * *